United States Patent [19]

Leger et al.

[11] 3,760,361

[45] Sept. 18, 1973

[54] MARKER CIRCUIT FOR A SWITCHING STAGE EQUIPPED WITH INTEGRATED DYNAMIC MEMORY SWITCHES

[75] Inventors: Marc Jean Pierre Leger, Chaville; Claude Paul Henri Lerouge, Maurepas; Marc Andre Regnier, Aulnay-sous-Bois, all of France

[73] Assignee: International Standard Electric Corporation, New York, N.Y.

[22] Filed: Sept. 29, 1972

[21] Appl. No.: 293,356

[30] Foreign Application Priority Data

Oct. 8, 1971 France ..........................7136232

[52] U.S. Cl. .......................... 340/166 R, 179/18 GF

[51] Int. Cl. .............................................. H04q 3/00

[58] Field of Search ................................ 340/166 R

[56] References Cited

UNITED STATES PATENTS

| | | | |
|---|---|---|---|
| 3,593,296 | 7/1971 | Girard | 340/166 R |
| 3,609,661 | 9/1971 | Hennes | 340/166 R |
| 3,651,467 | 3/1972 | Dejean | 340/166 R |

*Primary Examiner*—Donald J. Yusko

*Attorney*—C. Cornell Remsen, Jr. et al.

[57] ABSTRACT

Disclosed is a marker for controlling an electronic switching stage. Each crosspoint of the stage includes a holding flip-flop which is used by the marker in its path search, the holding flip flops being combined into a shift register. The contents of the shift register can be read without disturbing the condition of the associated crosspoints. A path search comprises the steps of a read-out of the crosspoint conditions followed by analysis of the available sections through which a path can be completed. A second read-out of the shift register is made during which the flip-flops are set to close the crosspoints of a switching path.

5 Claims, 16 Drawing Figures

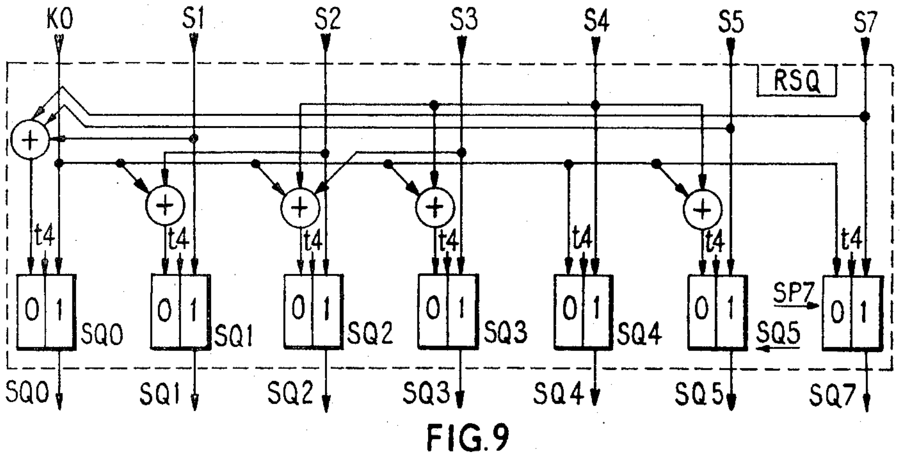
FIG.9
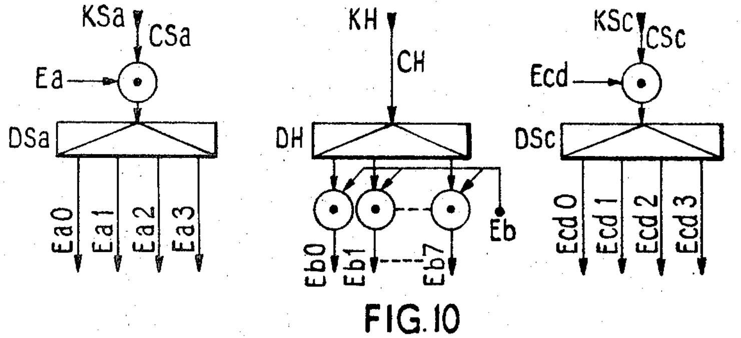
FIG.10
| | --11 | --10 | --01 | --00 | |
|---|---|---|---|---|---|
| 00-- | 3 | 2 | 1 | 0 | H0 |
| 01-- | 7 | 6 | 5 | 4 | H1 |
| 10-- | 11 | 10 | 9 | 8 | H2 |
| 11-- | 15 | 14 | 13 | 12 | H3 |
| | V3 | V2 | V1 | V0 | |
FIG.11

MARKER CIRCUIT FOR A SWITCHING STAGE EQUIPPED WITH INTEGRATED DYNAMIC MEMORY SWITCHES

The present invention concerns a marker circuit for a switching stage equipped with electronic switches associated to an integrated dynamic memory.

In U.S. Pat. No. 3,651,467 issued Mar. 21, 1972, entitled "Electronic Multiselector", a matrix switch is shown equipped with electronic switching circuits each comprising a flip-flop which controls the setting of the contact elements (MOS transistors for instance) into the closed or open position, and which provides the holding in the set position. A switching circuit of this type presents the unique ability to remain closed or open during a certain time when it is disconnected from the control flip-flop.

In a switch of the type shown, the flip-flops are connected as a shift register so that, when the switching circuit is disconnected, it is possible to transfer the contents of the register to a marker circuit to perform selective modifications of the information to relaize, for instance, a path connection or release.

The expression "switch with an integrated dynamic memory" defines this type of switch which allows to achieve path search in memory without the need of an independent image memory of the switching stage and without disturbing the operation of the said stage. It is understood that this integration of the memory in one stage presents numerous advantages and particularly that of minimizing errors occuring in updating of the memory.

In the Patent noted, the contact elements are large geometry MOS transistors which present a relatively large gate-to-substrate capacitance with low leakage. It is this capacitance which is used as memory when the switching circuit is disconnected. During this time, the operations of reading, modification and rewriting of the contents of the shift register are performed.

The functions of the marker of the present invention in its application to a switching stage comprising three selection stages T*a*, T*b*, T*c* are: (1) the path search (idle or busy path), (2) the connection or the release of said path and (3) the sending of a tone chosen among several tones, said tones being distributed through a fourth selection stage T*d*.

For a path search between two terminals, the initial data identifying these terminals and the sections of the stages T*a* and T*c* to which they are associated is present. The marker controls the reading of the registers identified by the initial data and sorts out the information so that, at the end of the reading, the marker knows the state, busy or idle, of all the outlets of the concerned sections. This information is then analyzed and it allows the identification of the section, in the stage T*b*, through which the path may be established.

The following operation, or up-dating, is an operation of connection or of release of a connection which includes a selective modification of the contents of the shift registers of the sections identified by the initial data and by the data collected during the path search. For establishing a connection, for example, the switching circuits X*t* belonging to the path receive a closing signal and all the switching circuits associated with the inlets and the outlets with which the circuits X*t* are associated receive an opening signal. Thus, at each operation, only one circuit is closed on a given inlet and a given outlet.

For the tone sending operations, the initial data provided is always complete and requires an up-dating which includes closing or opening a switching circuit in the stage T*d* through which a tone, chosen among several, is transmitted over a path.

An object of the present invention is therefore to provide a marker for a switching stage equipped with electronic switches with integrated dynamic memory.

To perform the operations of connection and release of path and of tone sending, there are provided means for collecting, in the switches of the switching stage, additional data needed for a path connection or release, analysis means for searching and for storing said additional data and up-dating and means for modifying the state of some cross-points according to the complete set of data.

According to another feature of the invention there are provided initially operative means to open all the switching circuits of the switching stage when setting the marker into operation.

Other objects, characteristics and advantages of the present invention will appear from the following description of an example of achievement, said description being taken in relation with the accompanying drawings in which.

Figures 4A, 4B, 4C, 4D:
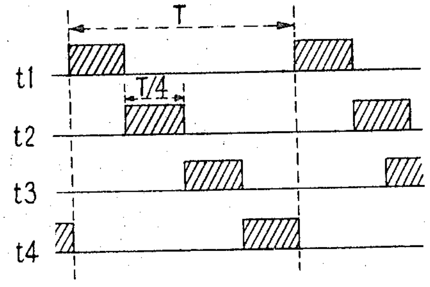
Figure 5:
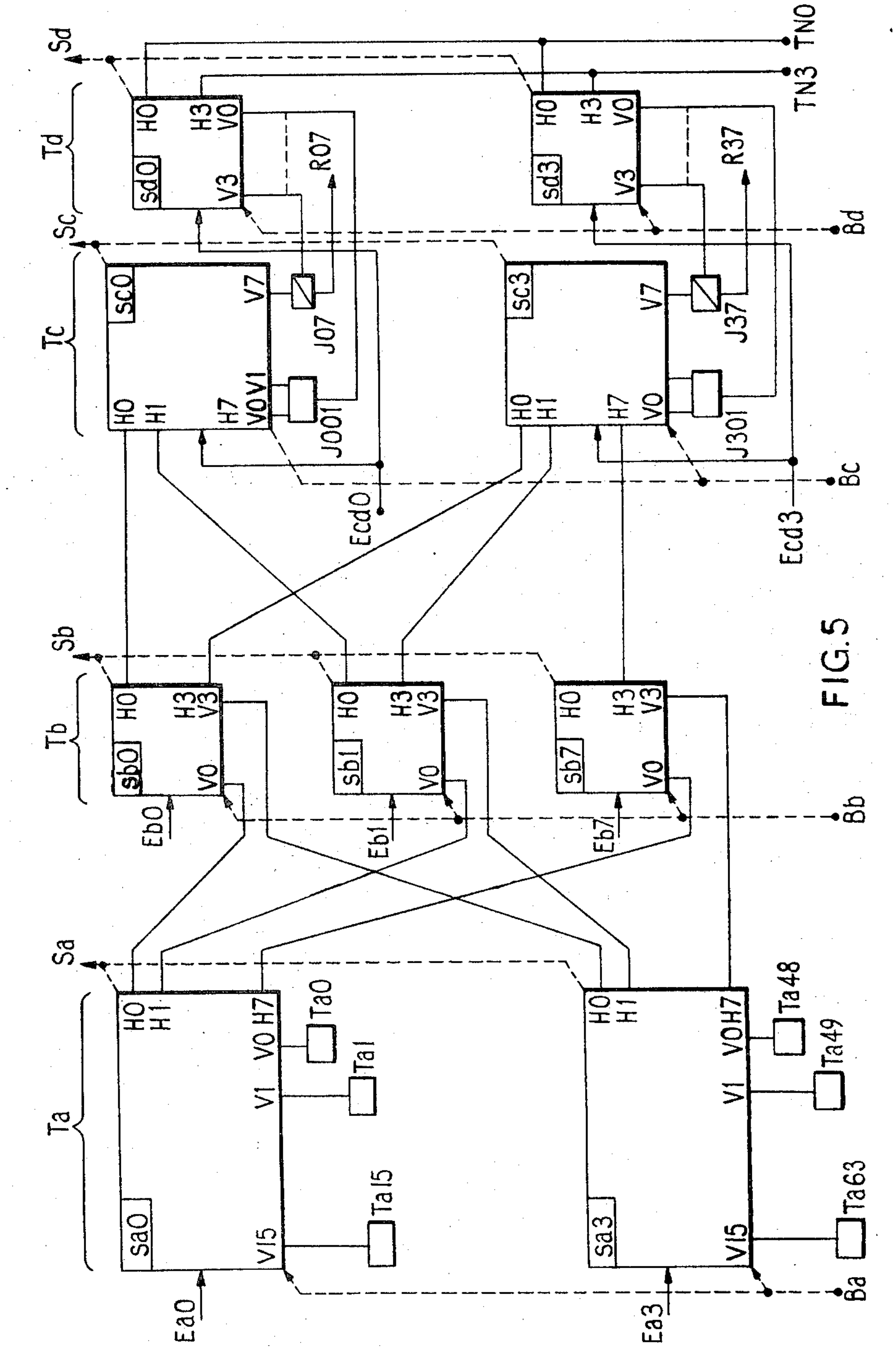
Figure 6:
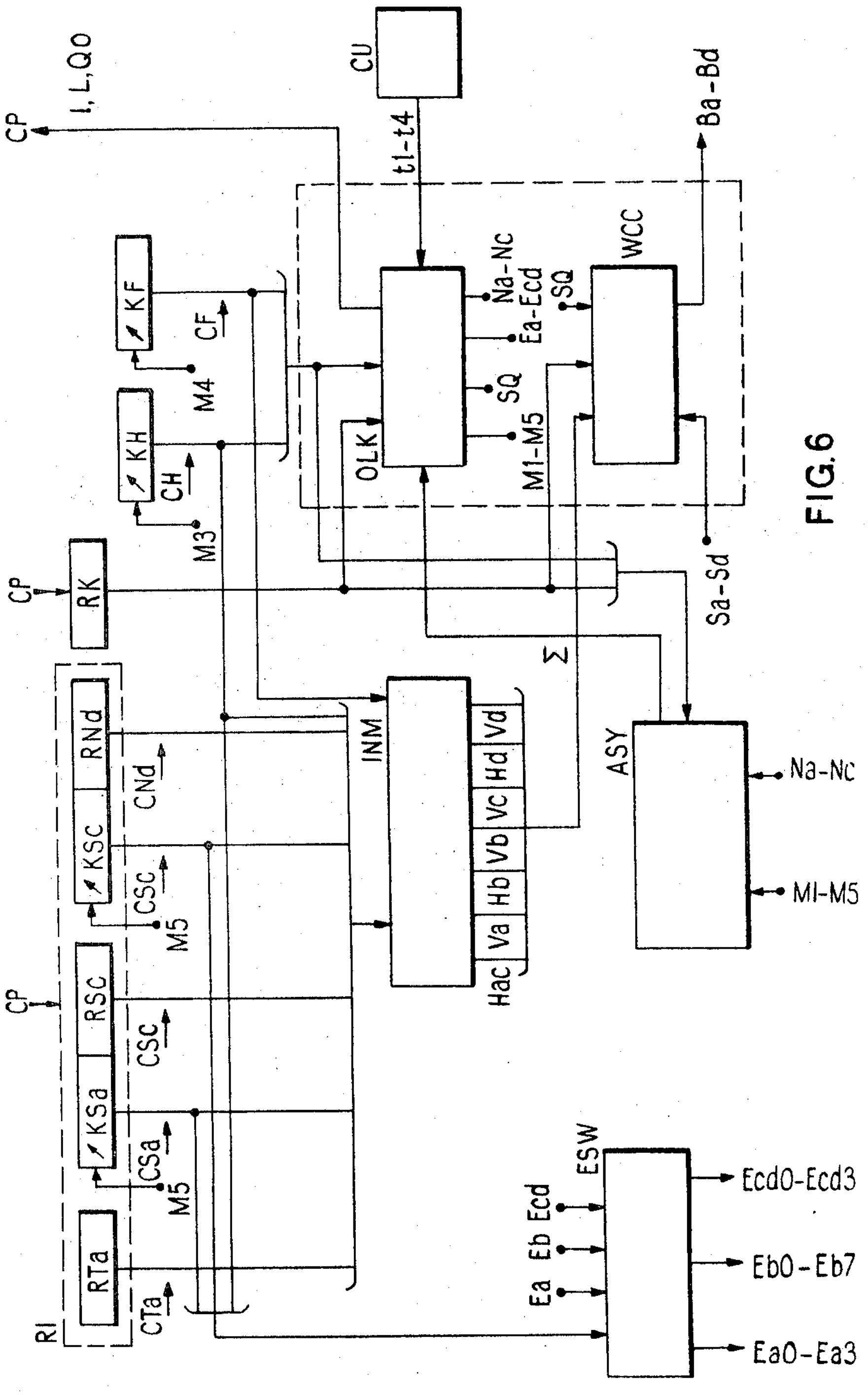
Figure 7:
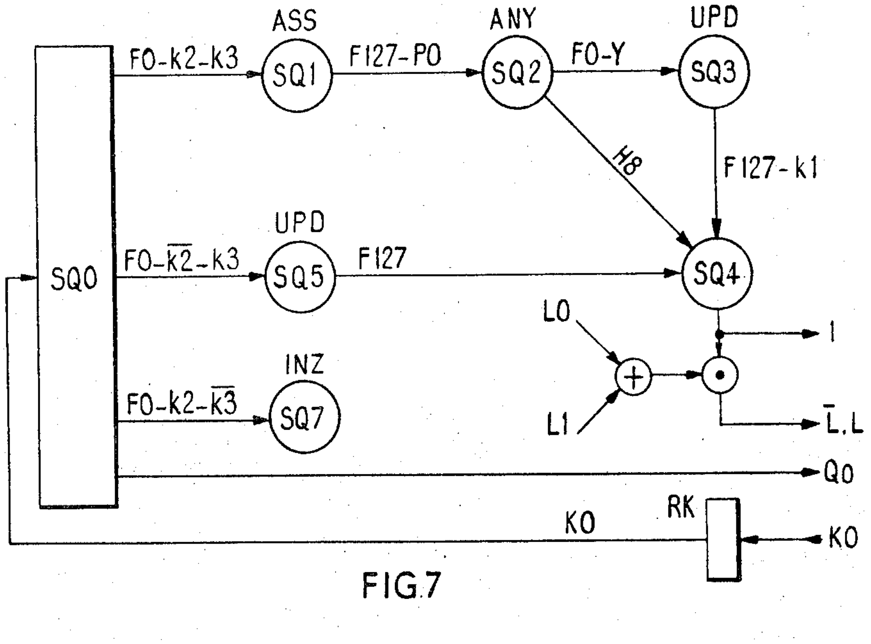
Figure 12:
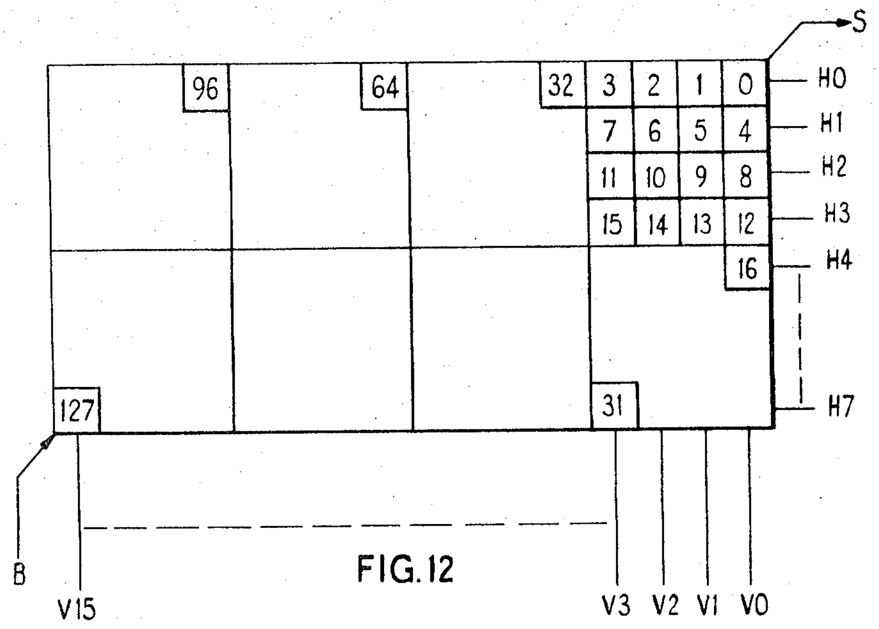
Figure 8:
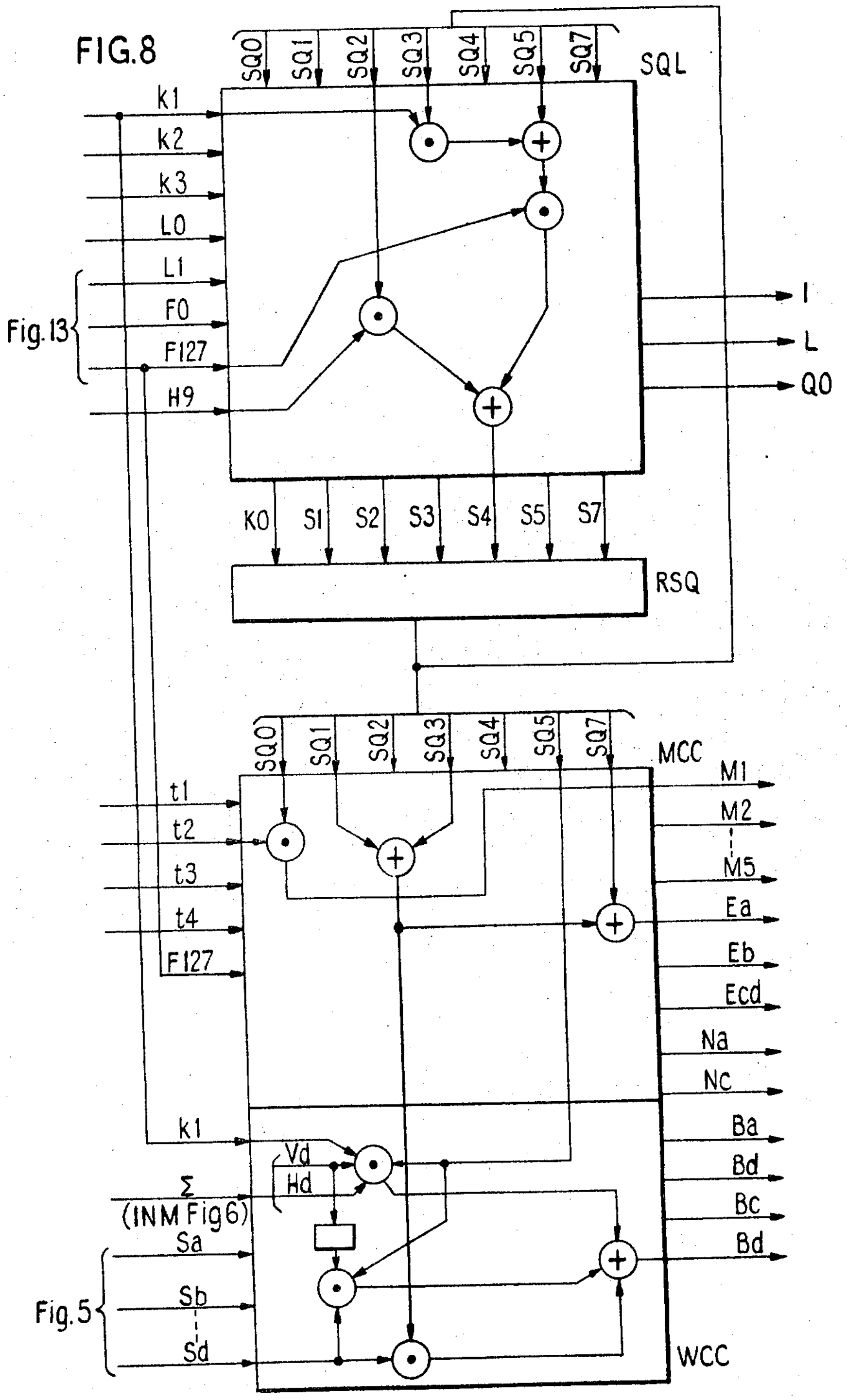
Figure 13:
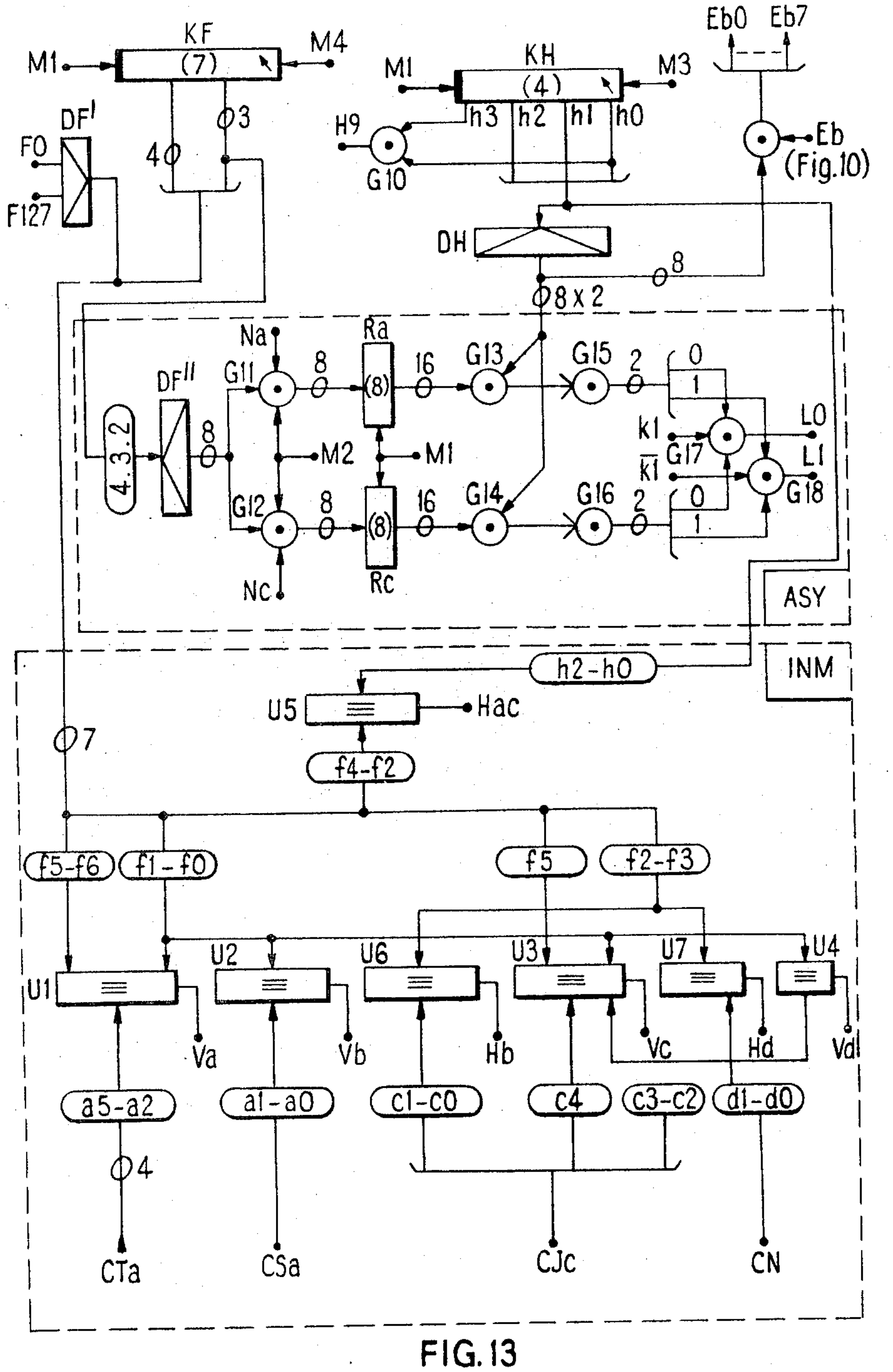

FIGS. 4.*a* through 4.*d* represent the timing diagram of the clock signals;

FIG. 5 represents a block diagram of a switching network;

FIG. 6 represents a schematic block diagram of the marker;

FIG. 7 represents the flow chart of the phase signals;

FIG. 8 represents a schematic diagram of the sequencing circuit and data circuits of the marker;

FIG. 9 represents the detailed diagram of the sequence register circuit of the marker;

FIG. 10 represents the registers circuits of the marker;

FIG. 11 is a block diagram representing the mode of coding the addresses of the different switching circuits in an elementary switch;

FIG. 12 is a block diagram representing a section comprising 4×2 elementary switches; and FIG. 13 represents the assembly and analysis circuit and also the inlet-outlet identification circuit of the marker.

To simplify the reading of the description, it will be divided as follows:

1. The integrated dynamic memory switch;
2. The switching network;
3. Description of the marker : the input and sequencing circuits;
4. Description of the marker : the access circuits;
5. Description of the marker : the operator circuits;
6. Method for address identification;
7. The assembly and analysis operations;
8. The up-dating operation.

1. THE INTEGRATED DYNAMIC MEMORY SWITCH

Relative to FIGS. 1 to 4, it should be noted that the method of using of a MOS switching circuit with an integrated memory and an elementary switch using the said circuit or integrated dynamic memory switch has been described in a detailed manner in the patent noted previously.

Figure 1:
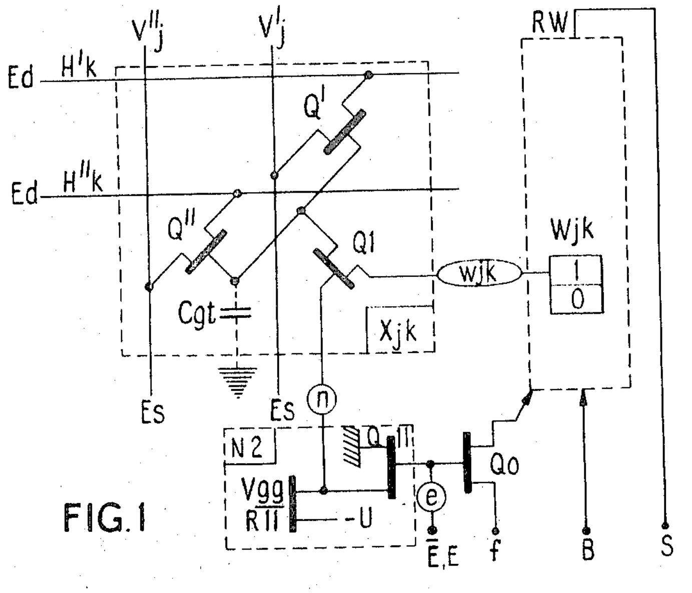
FIG. 1 represents a crosspoint of a switching circuit with an integrated memory.

FIG. 1 represents the circuits associated with a crosspoint formed by the intersection of the horizontals H'*k*, H''*k* and of the verticals V'*j* and V''*j*. Each one of the pairs of conductors H'*k*, V''*j* and H''*k* and V''*j* insures the transmission of the information either in one direction (four-wire switching) or in both directions (two-wire switching).

The two conductors of each pair are joined by a MOS transistor Q', Q'' the gates of which are connected to a first output electrode (source or drain) of a control MOS transistor labelled Q1. The set of these three transistors makes up a switching circuit Xjk.

The signals applied to the transistor Q1 are provided by:

1. The memory flip-flop Wjk (signal Wjk or $\overline{\text{Wjk}}$ present on the conductor wjk when the flip flop is respectively in the 1 or 0 state). The conductor wjk is connected to the second output electrode (drain or source) of the transistor Q1; and 2. The inverter N2, the output conductor *n* of which is connected to the gate of Q1.

The flip-flop Wjk constitutes one of the stages of a shift register RW made up of the series connection of the memory flip-flops of several switching circuits. This register receives clock signals t through a MOS transistor Qo. The incoming information is applied on its input B and the information taken out of the register appears on its input S.

The control conductor e of the transistor Qo receives one of the control signals E or $\overline{\text{E}}$ and it is also connected to the input of the inverter N2.

In the circuit X*jk*, the transistors Q' and Q'' have a relatively large geometry so that they present a low drain-to-source resistance Rds when they are on. The gate to substrate capacitance Cgt presents a rather high value so that, when the control transistor Q1 is switched off, the capacitance maintains for a timed period, the voltage which was applied by the flip-flop W*jk* before the switching off.

The control of the circuit X*jk* is achieved in the following way if we assume that the circuit X*jk* must be closed (open) when the flip-flop Wjk is in the state 1 (0).

When a signal $\overline{\text{E}}$ is applied to the conductor e, the transistor Q1 is off and the transistor Q1 is on, so that the signal W*jk* (or $\overline{\text{Wjk}}$) provided by the memory flip-flop is directly applied to the transistors Q', Q'' which are closed (or open).

When an activation signal E is applied to the conductor *e:*

The transistor Q1 is off and the transistors Q', Q'' remain in their previous state as explained hereabove;

The transistor Q*o* is on, applying the clock signals *t* to the shift register RW.

The contents of this register appear is series on the output S and they are applied to a marker circuit so that the state of at least one of its flip-flops is modified, for instance that of Wjk which is set to the 0 state. When this operation is ended, the marker controls the updating of the register by sending information in series on the input B.

When this operation is ended, a signal E is again applied to the conductor *e*, which switches off Q*o* and turns on Q1. The circuit set up again between W*jk* and the gate of Q1, provides the modification of the charge of C*gt* so that in the case of the example, the transistors Q' and Q'' are switched off.

Figure 2:
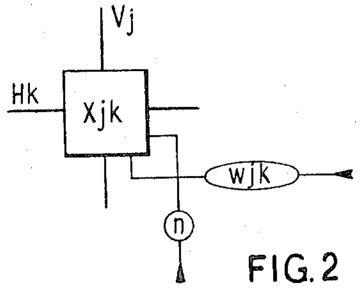
FIG. 2 represents the symbol representing the switching circuit of FIG. 1.

The switching circuit X*jk* is represented in a symbolic way in FIG. 2. On this figure the conductors V'*j*, V''*j* (H'*k*, H''*k*) have been grouped into a single conductor V*j* (H*k*) and we have represented the control conductors *n* and *wjk* as defined.

Figure 3:
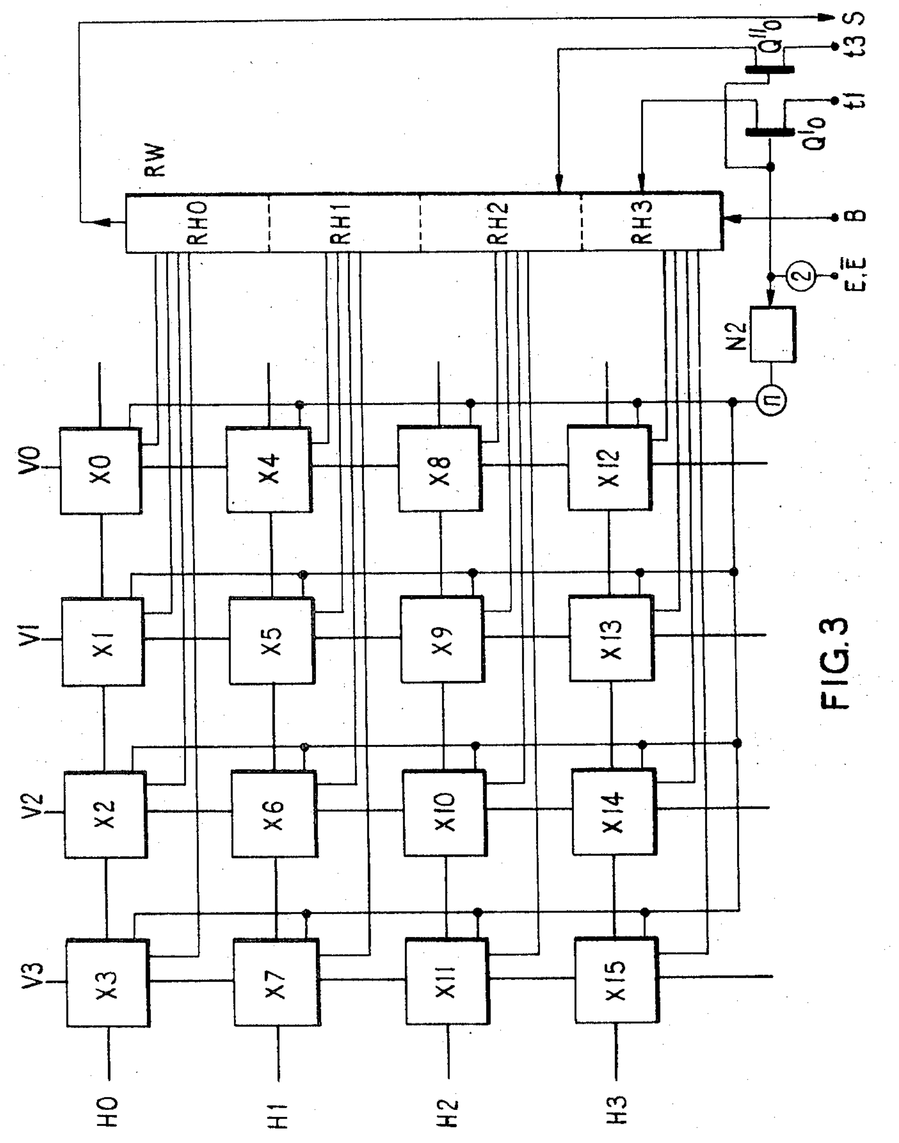
FIG. 3 represents a matrix comprising an elementary four by four switch.

FIG. 3 represents an elementary switch comprising 16 switching circuits X0, X1, X2 . . . X15 (four × four switch).

The memory flip-flops (such as W*jk*, FIG. 1) of these circuits are grouped in the shift register RW which has been divided into four sections RH0, RH1, RH2, RH3, comprising respectively the flip-flops of the circuits associated with the horizontals H0, H1, H2, H3. This register RW is a MOS-transistor static shift-register which receives the clock signals *t*1 and *t*3 and to which the information signals are applied on the input B.

FIGS. 4.*a* through 4.*d* represent the diagrams of the clock signals *t*1 to *t*4 which appear in time succession with a repetition period T and a duration T/4.

In FIG, 3, the conductors n of all the switching circuits are shown connected together which allows the blocking or unblocking simultaneously of all the transistors Q1 of the switch. The full contents of the register RW can thus be processed by the marker without disturbing the paths established through the switch.

The flip-flops of the register RW perform two distinct functions:

1. The function of controlling the state of the transistors associated with the crosspoints (signal $\overline{\text{E}}$);

2. The function of "dynamic network memory" when their states are transferred to the marker (signal E). As a matter of fact, it can be seen that these flip-flops are so ordered that the marker can build up the map of the useful configurations of the network.

2. THE SWITCHING NETWORK

The marker circuit according to the invention is designed to control the execution of various operations in a switching network providing both a concentration and a mixing.

FIG. 5 represents an example of a switching network providing the following functions:

1. Setting-up of half-connections between one of the input terminals T*a*0, T*a*1 . . . T*a*63 and one of the twenty-four output equipments. These connections are established through the switching stages T*a* (comprising four 16×8 sections labelled *sa*0, *sa*1, *sa*2, *sa*3), *Tb* (eight 4×4 sections labelled *sb*0 . . . *sb*7) and *Tc* (Four 8×8 sections labelled *sc*0 . . . *sc*3).

Each of these sections comprises a number of elementary switches of the type represented in FIG. 3.

Each vertical of the stage T*a* is connected to an input terminal such as a telephone line or station.

The verticals of each section of the stage Tc are connected to the output equipments which are:

a. The local junctors such as J001, J301, etc. . . . constituted by the half-junctors having access, for the junctor J001, to the verticals V0 and V1 of the section sc0.

Three local junctors are associated with each section;

b. The outgoing junctors such as J07, J37 having access on one hand to one vertical of the section and on the other hand to the outside network. For the junctor J07, these accesses are labelled V7 and R07. One outgoing junctor is associated to each section. In each section of this stage, it is seen that one vertical is not used.

The interconnections between T*a*, T*b*, T*c* represented in full lines are realized in a conventional way so that a complete mixing and a concentration in a ratio of two are obtained.

2. Tone emission on the half-connections through the switching stage T*d* (four 4×4 sections, labelled *sd*0 . . . *sd*3). This stage allows the connection of any of the four tone sources TN0 . . . TN3 to any of the local or outgoing junctors.

For performing these functions, the marker circuit must first search for idle paths between terminals and half-junctors. More precisely the terminal and the half-junctor which are to be connected are initially marked and this operation comprises the search for idle paths connecting these two devices.

A conventional network with concentration and mixing and comprising three states T*a*, T*b*, T*c* presents the following features:

a. From a vertical of a section of T*a* (T*c*), there is access to eight verticals (horizontals) of *tb* belonging respectively to the eight sections of this stage. Therefore:

There are eight possible paths between a terminal and a half-junctor, each section of T*b* providing one of said paths.

b. The identification code of an horizontal in T*a* (T*c*) is the same as the identification code of the section of T*b*. Therefore, as there is only one possible path through a given section of T*b*:

For a given connection, the horizontals in T*a* and T*c* as well as the section in T*b* are identified by the same code CH.

Table 1, following hereafter, represents the set of codes identifying a half-connection as well as the bit references of said codes. The first letter of each code is C.

Each bit of a code is identified by a small letter followed by a digit indicating its binary position beginning with the least significant bit : so the bit *a*0 of the code CS*a* is the least significant bit of this code (weight : $2^0 = 1$).

TABLE 1.—IDENTIFICATION CODES OF A HALF-CONNECTION

| | Stages | | | | Inlet/outlet symbols in stages Ta, Tb, Tc, Td |
|---|---|---|---|---|---|
| | Ta | Tb | Tc | Td | |
| Codes: | | | | | |
| Vertical | CTa | CSa | CJc | CJc | Va, Ve, Vc, Vd |
| | a5–a2 | a1–a0 | c4–c2 | c4–c3 | |
| Horizontal | CH | CSc | CH | CNd | HaC, Hb, Hd |
| | h2–h0 | c1–c0 | h2–h0 | d1–d0 | |
| Section | CSa | CH | CSc | Csc | |
| | a1–a0 | h2–h0 | c1–c0 | c1–c0 | |

All the codes of the table, except the code CH which is underlined, are initial data provided by the centralized control computer of the switching network when the computer asks for the execution of a path search or identification.

In the right column, we have represented symbols which will be used later on and which identify a given inlet (vertical) and outlet (horizontal) in each of the stages. One will notice that outlets of stages Ta and Tc bear the same reference Hac since, as we have just seen it, they have the same code.

The initial data is:

The code CT*a* defining one out of the 16 terminals connected to a section of the stage T*a;*

The code CS*a* defining one of the half-junctors connected to a section of the stage T*b;*

The code CS*c* defining the section in the stage T*c;*

The code CN*d* defining the tone to be sent.

As mentioned hereabove, each section is made up by the association of a number of elementary switches of the type shown in FIG. 3. In FIG. 5:

The conductors e have been multipled so that each section comprises a single activation input E*a*0, E*a*1, etc. . . . for the stage T*a;* E*b*0, E*b*1, etc. . . . for the stage T*b*, etc. . . . ;

The registers RW have been connected in series so that they constitute a single shift register RWS for each section, each section comprising a single input and a single output;

The inputs and the outputs of the different sections of a stage are multiplied. Thus, the stage T*a* has only one input Ba and one output S*a*.

In order to read and to rewrite the contents of the flip-flops of a section S*a*0 for instance, the section is selected by an activation signal E*a*0 and the signals *t*1, *t*3 then control the advance of the register RWS.

It can be seen that the homologous sections of the stages Tc and Td are controlled by the same activation signals E*cd*0, E*cd*1, etc. . . . so that the contents of their registers RWS are simultaneously read.

In a switching section, such as a section of the stages T*a*, T*b*, T*c*, at most a single switching point on a horizontal can be closed. On the other hand, a section of the stage T*d* is used to inject tones in junctors, one horizontal being assigned to each one of the tones TN*o* . . . TN3. Consequently, several switching circuits can be simultaneously closed on a single horizontal of stage T*d*.

3. GENERAL DESCRIPTION OF THE MARKER: THE INPUT AND SEQUENCING CIRCUITS

FIG. 6 represents the block diagram of the marker of the present invention which is the interface between the switching circuit of the FIG. 5 and the computer CP to provide centralized control for all the operations relating to path connection and release and also to tone sending.

The description of the marker circuits will be divided into three parts according to function:

1. The input and sequencing circuits described in this paragraph;
2. The switching network access circuits described in this paragraph;
3. The operator circuits described in Paragraph 5.

3.1 THE INPUT CIRCUIT

The marker operations are started by orders sent by the computer CP which are stored in the register RK. The different orders are shown in Table 2.

TABLE 2.—ORDERS

| Order | | Order codes | | | Corresponding phases |
|---|---|---|---|---|---|
| Object | Signal | k1 | k2 | k3 | |
| Network connection | K1 | 1 | 1 | 1 | |
| Network release | K2 | 0 | 1 | 1 | SQ1 to SQ4. |
| Tone connection | K3 | 1 | 0 | 1 | |
| Tone release | K4 | 0 | 0 | 1 | SQ5 and SQ4. |
| Initialization | K5 | 0 | 1 | 0 | SQ7. |
| Marker release | KO | 0 | 0 | 0 | SQO (idle). |

Each order is received together with the initial data needed for its execution (see table 1). The data is stored in the registers (RT*a*, RJ*c*, RN*d* for the codes CT*a*, CJ*c*, CN*d*) and the counters (KS*a*, KS*b* for the codes CS*a*, CS*b*) of the input register RI.

3.2 THE PHASE SEQUENCING

After reception of this data the marker starts a sequence of operations or "phases" represented on the flow-chart of FIG. 7.

The different types of operation are:

The assembly ASS

The analysis ANY

The up-dating UPD

The initialization INZ.

Each of the phases is made up of several microphases.

When an order is executed, the circuit is in phase SQ4 and the marker transmits to the computer first a signal I (executed order) and second a signal L (successful operation) or $\overline{L}$ (unsuccessful) which depend upon the signals L0 and L1 to be discussed in Paragraph 7.4.

The phase signals of FIG. 7 are provided by a sequence generator SLQ, located in the sequencer OLK.

The phase SQ0 is set after the reception of a marker release order K0 and indicates that the marker is idle. This one sends a signal Q0 to the computer.

TABLE 3.—NETWORK OPERATION SEQUENCING (ORDERS K1, K2)

| Logical conditions (at time t4) | Meaning | Phase signals | Operations and signals sent to the computer |
|---|---|---|---|
| SQ0.Fo.k2.k3=S1 | The marker is idle and receives an order K1 or K2. | SQ1 | Assembly. |
| SQ1.F127.HO=S2 | End of assembly | SQ2 | Z(KF)—Analysis. |
| SQ2.Fo.Y=S3 (1) | The analysis yields a positive result. | SQ3 | Up-dating. |
| SQ3.F127+SQ2.H9=S4 | End of up-dating for an order K1. The analysis yields a negative result. | SQ4 | Computer call by a signal I. Sending of a signal L or $\overline{L}$. |
| $\overline{k2}.\overline{k3}$=KO | The results have been seized by the computer which sends an Order KO. | SQ0 | Marker release Z(RSQ) |
| (1) | Y=k1.LO+$\overline{k1}$.L1 | | |

The active phases control the execution of the following operations:

Assembly: it is an operation which allows to collect, in the switching network, the information necessary to execute the setting-up of a path (connection) or the breaking of a path (release);

Analysis: This operation allows to identify completely a path by finding a code CH (see Table 1);

Up-dating: this operation allows to modify the state of certain cross-points to realize the connection or the release;

Initialization: when starting the marker, the state of the registers RWS of the elementary switches is undetermined. This operation allows to clear all the registers, so that all the switching circuits are then open.

During the assembly and up-dating operations, the identification of a cross-point is achieved with the codes stored by the counter KF. During the analysis operation, the identification code CH of the section in the stage Tb is provided by the counter KH.

TABLE 4.—SEQUENCING OF THE TONE AND INITIALIZATION OPERATIONS (ORDERS K3, K4, K5)

| Logical conditions (at time t4) | Meaning | Phase signals | Operations |
|---|---|---|---|
| SQ0.Fo.$\overline{k2}$.k3=S5 | The idle marker receives an order K3 or K4. | SQ5 | Up-dating. |
| SQ5.F127=S4 | End of up-dating for an order K3 or K4. | SQ4 | Computer call by a signal I. |
| $\overline{k2}.\overline{k3}$=KO | The computer sends an order KO. | SQ0 | Marker release. |
| $\overline{k2}.\overline{k3}$=KO | At operation start, the computer sends a liberation order KO. | SQ0 | Marker idle. |
| SQ0.Fo.k2.$\overline{k3}$=S7 | The marker processes the initialization order K5. | SQ7 | Initialization. |
| $\overline{K2}.\overline{k3}$=KO | After a software time-out, the marker receives a release order KO. | SQ0 | Marker release. |

Tables 3 and 4 show the sequencing logical conditions of the sequence generator. To simplify the writing of the logical conditions, the time *t*4 during which they are actually satisfied has not been included in the equations.

Some of the signals delivered by the sequence generator depend on the signals F0 and F127 (decoder DF', FIG. 13). They are:

Signals K0, S1, S2, S3, S4, S5, S7 controlling the setting up of the phase signals SQ0, SQ1, SQ2, SQ3, SQ4, SQ5, SQ7;

The signals I, L, Q which are sent to the computer.

3.3 THE MICROPHASES

In each phase, the sequencing of the microoperations is controlled by microphase signals provided by the circuit MCC belonging to the circuit OLK. The elaboration of these signals is a function of:

The value of the phase signal;

The signals *t*1 through *t*4 provided by the clock CU;

The progress state of the operation.

The microphase signals are:

The signal M1 which controls a general clearing during phase SQ0;

The activation signals E*a*, E*b*, E*cd* controlling the selection of the stages T*a*, T*b*, T*c*, T*d* (see FIG. 3);

The signals M2, M3, M4, M5 controlling the advance of the identification counters KF, KH and of the section counters KS*a*, KS*c*.

It is clear that these signals are synchronized with those of the clock CU and that, particularly, the content of a selected section is read synchronously with the advance of the counter KF.

The signals N*a* and N*c* controlling the assembly operation.

Table 5, which follows, shows the conditions of elaboration of these signals.

TABLE 5.—MICROPHASE SIGNALS DELIVERED BY THE CIRCUIT MCC

| Micro-phase signal | Phases SQ0 | SQ1 | SQ2 | SQ3 | SQ4 | SQ5 | SQ7 | Controlled operation |
|---|---|---|---|---|---|---|---|---|
| M1 | t2 | | | | | | | Z(KH, KF) Z(Ra, Rc). |
| M2 | | t2 | | | | | | Tf(Ra, Rb). |
| M3 | | | t2 | | | | | + 1 (KH). Z(KF). |
| M4 | | t1 | | t1 | | t1 | t1 | +1 (KF). |
| M5 | | | | | | | t4. F127 | +1 (KSa, KSc). |
| Ea | | X | | X | | | X | Activation. |
| Eb | | | | X | | | | Activation. |
| Ecd | | X | | X | | X | X | Activation. |
| Na | Sa(K1+Va) | | | | | | | Assembly. |
| Nc | Sc(K1+Vc) | | | | | | | Assembly. |

NOTE.—In the Table 5, the labels of the column "Controlled operation" have the following meaning:
Z(KH etc. 111)=clearing of the counter KH, etc.
Tf(Ra, Rb)=transfer of information into the registers Ra, Rb.
+1 (KH)=increase by one unit of the content of the counter KH.

In the upper part of Table 5, the presence (for instance) of the signal *t*2 in the first line means that the signal M1 is generated for the logical condition **SQ0.*t*2**. So it is with the lower part of the table (signals N*a*, N*c*). In the middle part of said table, the presence of a cross indicates that the output signal, E*b* for instance, is generated during the whole duration of the phase SQ3.

3.4 DESCRIPTION OF THE CIRCUIT OLK

Tables 3, 4, and 5 show the elaboration conditions of the phase and microphase signals. It is understood that the realization of the circuits to complete these logical conditions are well-known in the art. Nevertheless, in FIGS. 8 and 9, a possible realization method is shown.

FIG. 8 represents the operation sequencing circuit OLK comprising the circuits SQL and MCC and also a circuit WCC which will be described in the next paragraph.

The circuit SQL controls the generation of the phase signals which are stored in the register of the sequence generator RSQ, the detailed showing of which is indicated in FIG. 9.

Register RSQ comprises one JK flip-flop per phase which bears the same reference as the phase signal which it delivers. Each flip-flop is set to the 1 state at time *t*4 by a signal K0, S1 . . . S5, S7 delivered by the circuit SQL. When a flip-flop, such as SQ2 receives a signal S2, said signal controls at the same time the resetting to the 0 state of the flip-flops corresponding to the previous phase which is, in this case, the phase SQ3. Besides, the reception of a marker release order K0 controls the resetting to 0 of all the flip-flops of RSQ.

In FIG. 8, we have represented, as an example, the logical circuits which are used:

in the circuit SLQ, for the generation of the signal S4;

in the circuit MCC, for the generation of the signal E*a*.

4. GENERAL DESCRIPTION OF THE MARKER : THE ACCESS CIRCUITS

The access circuits to the switching stage of FIG. 5 provide the following functions:

Selection of the sections;

Collection of the data stored in the registers RWS of the selected sections;

Writing of data in the said registers.

One will notice that the reading of the registers RWS being destructive, a data collection operation is immediately followed by a rewriting operation so that their contents are restored.

4.1 THE SELECTION OF SECTIONS

The selection of sections is achieved during phases SQ1, SQ3, SQ5 and SQ7 (see Table 5) through the circuit ESW (FIG. 6). Circuit ESW receives:

The signals E*a*, E*b*, E*cd* which indicate that the current operation concerns the stage T*a*, T*b*, T*c* and T*d*. These signals have been defined previously relative to FIG. 5;

The codes CS*a*, CH, CS*c* which identify the section in the stage.

FIG. 10 represents the detailed diagram of circuit ESW which comprises:

The decoders DS*a*, DH, DS*c* assigned to the decoding of the codes CS*a*, CH, CS*c;*

The decoding control gates controlled by the signals E*a*, E*b*, E*cd*.

The output signals of this circuit are applied to the inputs having the same reference designations as FIG. 5.

4.2 DATA COLLECTION AND RESTORING

These operations are controlled by the circuit WCC (FIGS. 6 and 8) which operates during the phases SQ1, SQ3 and SQ5. The information, extracted from the selection sections under the control of the signals provided by the circuit ESW, appear on the outputs S*a*–S*d* of the switching stage and are applied to the circuit WCC. This circuit provides signals on the outputs B*a*–B*d* which are applied to the inputs bearing like reference designations in the switching stage.

The generation of the signals Ba-Bd is controlled by:

The signals S*a*–S*d*;

The order signals;

The marking signals V*a*, H*ac*, V*b*, etc. . . . provided by the inlet-outlet identification circuit INM are described in the next paragraph.

These signals, elaborated "in flight" during the reading of the registers RWS, mark the verticals and the horizontals to which belong the switching circuits the state of which is read. So, the signal V*c* (H*c*) marks the time when the state of a memory flip-flop associated with the vertical (horizontal) identified by the code CJ*c* (CH) is read.

Table 6 lists the conditions for generation of the signals B*a*–B*d*.

TABLE 6: Signals elaborated in the circuit WCC.

| Output | SQ1 + | SQ3 | + SQ5 |
|---|---|---|---|
| Ba | Sa | $kl.Va.Hac+\overline{V}a.\overline{Hac}.Sa$ | |
| Bb | | $kl.Vb.Hb+\overline{Vb}.\overline{Hb}.Sb$ | |
| Bc | Sc | $kl.Vc.Hac+\overline{V}c.\overline{H}ac.Sc.$ | Sc |
| Bd | Sd | Sd | $Kl.Vd.Hd+\overline{V}d.Sd$ |

In this table, it can be noted that: $Bc = SQ1.Sc + SQ3.(k1.Vc.\ Hac.+ \overline{V}c.\overline{Hac}.Sc) + SQ5.Sc$.

If referring to the defniitions given hereabove we can see that:

The condition $\overline{V}c.\overline{Hac}$ is indicated for the switching circuit located at the intersection of the vertical and of the horizontal identified by the codes CJ*c* and CH;

The condition $\overline{V}c.\overline{Hac}$ is indicated for all the circuits which are neither on this vertical nor on this horizontal.

Further, the condition $Bc = (SQ1 + SQ5).Sc$ means that the state of the considered switching circuit X*t* may be rewritten without any modification. Later, we designate by circuit the address of the switching circuit, the state of which is read at a given time.

It is clear that during the initialization phase SQ7, this circuit WCC is off, so that at the end of this operation, the registers RWS are clear and all the switching circuits are open. From Table 5, it can be seen that, at each signal F127 which characterizes the end of the reading of the contents of a register RWS, a signal M5 is elaborated and controls the advance of the counters of the section KS*a* and KS*c* by one unit. That advance permits successive clearing of all the sections of the stages T*a*, T*c* and T*d*.

The duration of the opeation is controlled by timing which is realized in the computer and the end of which controls the emission of an order K0.

The lower part of FIG. 8 represents a method of using circuit WCC. The circuit has been coupled with the circuits MCC and SQL because, similar to these circuits, the operation of circuit WCC is controlled by the phase signals. In FIG. 8, the logic circuits for generating the signal Bd are shown.

5. GENERAL DESCRIPTION OF THE MARKER : THE OPERATOR CIRCUITS

The following circuits are grouped under the name "Operator circuits":

Address identification counter KF providing, at each base signal cycle of odd phases (SQ1, SQ3, SQ5, SQ7), the code which identifies the circuit X*t*. This counter advances under the control of the signals M4 (Table 5);

The horizontal counter KH providing the code CH at the end of the phase SQ2. This counter advances under the control of the signals M3;

The circuits ASY and INM which will be described hereunder.

5.1 THE ASSEMBLY AND ANALYSIS CIRCUIT ASY

This circuit is used during the phases SQ1 (assembly) and SQ2 (analysis).

During the assembly phase SQ1, the circuit ESW selects the sections of the stages T*a* and T*c* (see Table 5) wherein the contents of the associated RWS registers must be examined. At each cycle of base signals *t*1–*t*4:

The signal *t*1 controls the advance of these RWS registers by one unit, the read-out bits appearing on the conductors S*a* and S*c* (FIG. 5);

The signal M4, appearing at the same time *t*1, controls the advance by one unit of the counter KF so that it shows the identification code of the horizontal to which the bits read in the registers RWS belong. The state of the flip-flops, characterized by the value of the signals S*a* and S*c*, is written into two registers R*a* (assigned to the stage T*a*) and R*c* (stage T*c*) comprising each a flip-flop per horizontal. Consequently, when the registers RW are completely read, each flip-flop of these registers shows if the corresponding horizontal is idle or busy;

The signal *t*3 controls the rewriting of the information read during *t*1 into the registers RWS.

During the analysis phase SQ2, the signal M3, appearing at each time *t*2, controls the advance by one unit of the counter KH. The succession of codes CH controls the scanning of the flip-flops in the registers Ra and Rc so as to identify:

Either a section T*b* through which a new connection can be established (order K1);

Or the section T*b* used by an existing connection (orderK2).

The circuit and its operation mode will be described in paragraph 7.

5.2 THE INLET-OUTLET MARKING CIRCUIT INM

This circuit is used during the phases SQ3 — Table 3 — and SQ5 — Table 4. During these phases, the circuit ESW selects the sections of the stages T*a*, T*b*, T*c*, T*d* (see Table 5) wherein the contents of the RWS registers have to be modified.

As for the assembly phases, the advance of the registers RWS and of the counter KF is controlled at time *t*1.

The sequence of codes provided by the counter KF is compared to the codes stored in the register R1 and to the code stored in the counter KH at the end of the phase SQ2. This comparison provides the marking signals V*a*, H*ac*, V*b*, etc. . . . defined in the Paragraph 4.2. This circuit and its operation will be described in detail in Paragraph 8.

6. METHOD FOR ADDRESS IDENTIFICATION

We have seen in Paragraph 5.1, during the phase SQ1, the operation of identifying the horizontal to which belongs each circuit X*t*, during phase SQ1 was described. Besides, we achieve in the circuit INM (Paragraph 5.2) the marking of some verticals and horizontals during the phases SQ3 and SQ5 the marking being obtained from codes identifying these inlets and outlets.

All these operations can be grouped under the name "address identification in a section". The identification is made possible in a very easy manner through a special interconnection, in each section, of the individual flip-flops of the shift register RWS.

We have described in FIG. 5 a switching network realized with elementary 4×4 switches.

FIG. 11 represents in a symbolic manner, the interconnection of the flip-flops in a switch of this type for implementing a shift register RWS. In FIG. 11, the codes characterizing the circuits X0, X1 . . . X15 are, in decimal base, the codes 0, 1 . . . 15. If this code figure is compared to FIG. 3, it can be seen that part RHO of the register RW is assigned to the addresses 0, 1, 2, 3 and that, when the contents of this register are transmitted to the marker on the output S, the information written at these addresses is sent in the same order 0, 1, 2, 3.

In other respects we have seen that these addresses were identified by the codes provided by the counter KF which advances synchronously with the reading of the register RWS. So, the information written at the addresses 0, 1, 2, 3, etc. . . . is identified by the binary codes whose decimal equivalents are 0, 1, 2, 3, etc. . .

The binary codes representing the address of a 4×4 switch are four-bit codes *b3*, *b2*, *b1*, *b0* (*b3* is the most significant bit) and the method for connecting the switching circuits to the register RW (FIG. 3), as shown in the table of FIG. 11, is that:

The two most significant bits *b3* and *b2* characterize the position of the horizontal in the switch. Thus for instance *b3b2* = 00 characterizes the first horizontal H0, *b3b2* = 01 characterizes the second horizontal H1 etc. . . . ;

The two less significant digits, *b1* and *b0*, characterize, in the same way, the position of the vertical in the switch.

FIG. 12 represents a switching section made up by the association of eight elementary switches and comprising a total of sixteen verticals (V0 through V15) and 8 horizontals (H0 through H7).

The registers RW of the different switches are interconnected in series in such a way that the information appears, on the output S, in the order indicated by the decimal address codes represented on the figure.

The section comprising $2^7 = 128$ circuits, the corresponding binary address codes provided by the counter KF have 7 bits *f6*, *f5* . . . *f0*.

This interconnection order identifies the switching circuits belonging to each horizontal and each vertical by a special code constituted by the association of a number of bits of the binary address code. Tables 7 and 8 hereunder show how to determine these bits.

Table 7 represents the bits of the address codes which characterize the positions of the different horizontals of said section. On the two first lines of this figure, we show the codes characterizing the address of the first switching circuit of the considered horizontal or "First codes" and on the third line the bits allowing the identification of the different horizontals.

The columns H0 through H3 group the information relating to the first elementary switch which has been studied in connection with FIG. 5.

It should be noted that the positions of the significant bits given on the third line of the figure are equal to the exponents of the second line. This relationship can be enlarged to the horizontals H4 through H7 and one sees that the horizontal to which the switching circuit X*t* belongs is identified by a code comprising the "central" bits *f4*, *f3*, *f2* of the address code provided by the counter KF.

Table 8 is a representation similar to that of Table 7, for the purpose of showing the codes identifying the verticals. The left part of the table concerns the verticals V1 through V3 which have been studied in connection with FIG. 11, and, as in Table 7, the positions of the significant bits are equal to the exponents of the second line.

The right part concerns the verticals V4, V8, V12 which are the first ones of each of the other switches of the section. One sees that they are identified by the bits *f6* and *f5* so that the vertical, to which belongs the switching circuit the state of which is read at a given time, is identified by a code made up by the "extreme" bits *f6*, *f5*, *f1*, *f0*.

One sees therefore that, in each section, the switching circuits are connected in series so that, when reading in series, their serial numbers in binary code provided by the synchronized counter KF allow to identify easily the horizontal and the vertical to which they are associated.

So, for the 16-inlet and eight-outlet section (128 switching circuits) shown on FIG. 12:

The subset of bits, *f4*, *f3*, *f2* (central bits) identifies the horizontal (outlet);

The subset of bits, *f6*, *f5*, *f1* and *f0*, (extreme bits) identifies the vertical (inlet).

The 7-bit codes are provided by the assembly counter KF which advances synchronously with the reading of the section.

In a section comprising eight inlets instead of 16 as many outlets (section of the stage T*c*), the same central bits *f4*, *f3*, *f2* identify the outlet. But, among the extreme bits, the most significant bit *f6* has no more signification for the identification.

At least, in a four-inlet and four-outlet section (stages T*b*, T*d*) the input is identified by the bits *f0*, *f1* and the output by the bits *f2*, *f3*.

TABLE 7.—HORIZONTAL IDENTIFICATION IN A SECTION

| Horizontals | | H0 | H1 | H2 | H3 | H4 | H5 | H6 | H7 |
|---|---|---|---|---|---|---|---|---|---|
| First code | Decimal | 0 | 4 | 8 | 12 | 16 | 20 | 24 | 28 |
| | Binary | 0 | $2^2$ | $2^3$ | $2^2+2^3$ | $2^4$ | $2^4+2^2$ | $2^4+2^3$ | $2^4+2^3+2^2$ |
| Identification bits | | | f3–f2 | | | | f4–f3–f2 | | |

TABLE 8.—VERTICAL IDENTIFICATION IN A SECTION

| Verticals | | V0 | V1 | V2 | V3 | V4 | V8 | V12 |
|---|---|---|---|---|---|---|---|---|
| First code | Decimal | 0 | 1 | 2 | 3 | 32 | 64 | 96 |
| | Binary | | $2^0$ | $2^1$ | $2^0+2^1$ | $2^5$ | $2^6$ | $2^5 2^6$ |
| Identification bits | | | f1–f0 | | | | f6–f5 | |

This reduction of the number of significant bits for inlet/outlet identification shows that the contents of the section of the stages T*b*, T*c*, T*d* are read several times during one reading in the stage T*a*. Of course, this re-reading does not present any drawback.

7. THE ASSEMBLY AND ANALYSIS OPERATIONS

In connection with FIG. 13, we will now describe the circuit ASY which controls the assembly and analysis operations and to explain its operation. As one has seen in the Paragraph 5.1, this circuit is used during the phases SQ1 and SQ2.

7.1 CIRCUIT DESCRIPTION

The circuit ASY comprises:

a. The decoder DF'' to which are applied the central bits *f*4, *f*3, *f*2 of the code provided by the counter KF. These bits identify the horizontal with which the switching circuit X*t* is associated. Each one of the eight outputs of this decoder characterizes one of the eight horizontals of the selected sections;
b. A switching circuit made up by the AND circuits G11, G12 controlled by the signals N*a*, N*c* (see Table 5);
c. The registers R*a*, R*c* giving the state of the horizontals and comprising eight flip-flops each. Each of these flip-flops is connected to one of the outputs of the decoder DH and it is therefore assigned to a given horizontal in the section. The writing of information in these registers is controlled by the switching circuit;
d. The analysis circuit comprises the decoder DH associated to the three less significant bits of the counter KH, the multiple AND circuits G13, G14, the OR circuits G15, G16 and the AND circuits G17, G18. Each one of the multiple gates G13, G14 comprises sixteen elementary gates to which the outputs 0 and 1 of the registers R*a*, R*c* are applied. These gates are controlled in groups of two by the signals provided by the decoder DH. When the counter KH steps up, from the position zero, under the control of the signal M3, the contents of the registers R*a* and R*c* are scanned, starting with the flip-flop assigned to the horizontal HO.

The outputs of the gates G13, G15 are applied to the double OR circuits G15, G16, each of the elementary OR circuits of each pair being respectively assigned to the set of the outputs 0 and to the set of the outputs 1 of the flip-flops of R*a* (G15) and R*c* (G16).

At last, the AND circuits G17, A18 make a comparator of the state of the homologous flip-flops in R*a* and R*c*, the circuit G17 (G18) providing a signal L0 (L1) when both these flip-flops are in the 0 (1) state. One will notice that the elaboration of these signals is conditioned by the signal k1 ($\overline{k1}$) (see table 2).

7.2 THE ASSEMBLY OPERATION FOR THE SEARCH OF FREE OUTLETS (PHASE SQ1)

The object of this operation, used for the search of an idle path between an inlet identified by the codes CT*a*, C*sa*, and an inlet identified by the codes CJ*c*, CS*c*, is to assemble, in R*a* and R*c*, information characterizing the occupancy state of the outlets of the sections identified by the codes CS*a* and C*sc*.

To do that, the signal SQ1 controls the generation of the following signals (Table 5):

E*a* and E*cd*, which control the activation of the selected sections;

NA = SQ1.*k*1.*Sa* et Nc = *Sq*1.*k*1.*Sc*. (One will notice that the condition SQ1.*k*1 characterizes an order K1). These signals control, when the circuit X*t* is closed (condition S*a* or S*c*), the writing of a digit 1 in the flip-flop of R*a* or R*c* selected by the central bits *f*4, *f*3, *f*2 of the code CF.

Consequently, if at least one cross-point on a given outlet (horizontal) is closed, the corresponding flip-flop of R*a* or R*c* is set in the 1 state until the end of the scanning of the section, this scanning end being characterized by the apparition of the code 127 in the counter KF, that is the condition F127. As shown in the table 3, the assembly phase is then ended and the phase SQ2 begins. Each flip-flop of R*a* (R*c*) which is in the 0 state characterizes then a free outlet in the section identified by the code CS*a* (CS*c*).

7.3 THE ASSEMBLY OPERATION FOR THE SEARCH OF A BUSY OUTLET (PHASE SQ1)

The object of this operation, used when identifying a path whose codes CT*a*, CS*a*, CJ*c* and CS*c* are known, is to assemble, in R*a* and R*c*, information for finding the missing code CH.

In this operation, the information to be written in R*a* and R*c* is limited to that coming from the switching circuits associated to the inlets (verticals) V*a*, V*c* whose codes are written in RT*a* and RV*c*. This is obtained for the logical conditions N*a* = SQ1.S*a*.V*a* and N*c* = SQ1.S*c*.V*c* (see Table 5). At the end of the operation (signal F127, a flip-flop of R*a* (R*c*) which is in the 1 state characterizes a switching circuit closed on the inlet V*a* (V*c*), i.e. a busy outlet.

7.4 THE ANALYSIS OPERATION (PHASE SQ2)

The object of this operation, which is executed after either type of assembly described hereabove, is to search for the code CH identifying a section in the stage T*b* and outlets in stages T*a* and T*c*. The counter KH advances by one at each cycle of the timing signals (signal M3) and simultaneously scans the homologous flip-flops of R*a* and R*c*. The following signals are obtained:

a. Signal L0 when two homologous flip-flops are in the 0 state, that is to say when the homologous outlets of the sections selected in T*a* and T*c* are free;
b. Signal L1 when these two flip-flops are in the 1 state, that is to say when the homologous outputs in the selected sections are busy.

In both cases, the three less significant bits of the counter KH make up the code CH when the output signal appears.

In Table 3, one sees that the next phase depends upon the value, Y or $\overline{Y}$, of the equation Y = $\overline{k1}$.L0 + *k*1.L1. The first part of this equation characterizes the success of a path search for a network connection order K1 (signal *k*1) and the second part the success of a path identification for a network release order K2 (signal $\overline{k1}$).

As soon as the condition Y appears, the phase SQ3 is immediately switched on, so that the counter KH is stopped;

If the counter KH provides a signal H9, which characterizes the fact that all the flip-flops of the registers R*a* and R*c* have been scanned without the elaboration of a signal Y, the phase SQ4 is switched on.

From FIG. 13 it can be seen that the signal H9 is decoded through the AND circuit G10 when the most significant bit and the least significant bit of the contents of KH are equal to 1 (bits *h*3 et *h*0).

8. THE UP-DATING OPERATION

As described in Paragraph 4.3, the information needed for up-dating during the phases SQ3 (orders K1, K2) and SQ5 (orders K3, *k*4) are provided by the circuit INM represented in FIG. 13. This information controls the operation of the circuit WCC (Paragraph 4.2, Table 6).

8.1 PRINCIPLE OF INLET/OUTLET MARKING

The inlet/outlet marking generates "in flight" — i.e. during the reading of the registers RWs of the selected sections — signals V*a*, H*ac*, V*b*, H*b*, etc. . . . which mark the inlets and the outlets whose codes are written in the register R1 and in the counter KH (FIG. 6).

In the circuit INM, groups of bits selected on one hand among those of the register R1 are compared against those of the counter KH, and those of the counter KF. The interrelationship of these bits has already been noted in Tables 1, 7 and 8. Further, the meaning of the different bits of the code CF has been noted in Paragraph 5 and in Tables 7 and 8.

Table 9, directly obtained from Tables 7 and 8, gives the correspondence between the bits contained in RI and KH and the bits of the code CF. To obtain a given output signal, V*a* for instance, we compare the bits *a*5–*a*2 of the part 1 of the table to the bits *f*6, *f*5, *f*1, *f*0 of the part 2 of the table. These bits are marked by a sign "/".

1. Writing during the phase SQ1: this phase only concerns the assembly of information about the state of the horizontals in the selected sections. The information collected on the conductors S*a*, S*c*, S*d* is rewritten without modification as shown in column 1 of Table 6. The conditions shown are: B*a* = SQ1.S*a*, B*c* = SQ1.S*c*, B*d* = S*q*1.S*d*;

2. Writing during the phase SQ3: the phase SQ3 ends the execution of a network connection order K1 or of a network release order K2 and it concerns the sections selected in the stages T*a*, T*b*, T*c* in which modifications have been done in relation with the marking signals. As the contents of the selected section in T*d* is also read, it is rewritten without modification (condition: B*d* = S*q*3.S*d*).

The conditions of modification in the stages T*a*, T*b*, T*c* are shown in the column SQ3 of Table 6. In the stage T*a*:

a. The condition V*a*.H*ac* appears when reading the state of the switching circuit X*a* located at the cross-point identified by the codes CT*a* and CH. The result is: B*a* = SQ3.*k*1.V*a*.H*ac*, i.e. that this circuit is closed if the executed order is the order *k*1;

b. The condition $\overline{\text{Va.Hac}}$ appears when reading the state of all the switching circuits which are associated neither to this inlet nor to this outlet. The result is: B*a* = SQ3. $\overline{Va.Hac}$.Sa i.e. that, regardless of the executed order, only the state of the switching circuits, which are associated neither with this inlet nor with this outlet, is rewritten without modification while the other circuits receive an opening order.

Consequently:

When up-dating for an order K1, the switching circuit X*a* receives a closing order B*a* and all the circuits associated to V*a* and H*ac* receive an opening order $\overline{Ba}$;

TABLE 9.—CODE COMPARISON IN THE CIRCUIT INM

| Marking signal | CTa | | | | CSa | | CH | | | CJc | | | CSc | | CNd | | CF | | | | | | |
|---|---|---|---|---|---|---|---|---|---|---|---|---|---|---|---|---|---|---|---|---|---|---|---|
| | a5 | a4 | a3 | a2 | a1 | a0 | h2 | h1 | h0 | c4 | c3 | c2 | c1 | c0 | d1 | d0 | f6 | f5 | f4 | f3 | f2 | f1 | f0 |
| Va | / | / | / | / | | | | | | | | | | | | | / | / | | | | / | / |
| Vb | | | | | / | / | | | | | | | | | | | | | | | | / | / |
| Vc | | | | | | | | | | / | / | / | | | | | | / | | | | / | / |
| Vd | | | | | | | | | | / | / | | | | | | | | | | | / | / |
| Hac | | | | | | | / | / | / | | | | | | | | | | / | / | / | | |
| Hb | | | | | | | | | | | | | / | / | | | | | | / | / | | |
| Hd | | | | | | | | | | | | | | | / | / | | | | / | / | | |
| | | | | | | | | 1 | | | | | | | | | | | | 2 | | | |

8.2 DESCRIPTION OF THE CIRCUIT INM

The circuit INM, which provides the seven marking signals shown in the first column of Table 9, comprises seven comparators U1–U7.

The bits applied to these comparators are identified on each one of the conductors which are connected to it.

8.3 THE WRITING CONTROL DURING THE PHASES SQ2 and SQ3

The circuit WCC is used not only during the up-dating phases SQ3, SQ5 but also during the assembly phase SQ1.

When up-dating for an order K2, all the circuits associated to V*a* and H*ac* receive an opening order $\overline{Ba}$.

The interpretation of the writing conditions for the stages T*b* and T*c* is done in the same manner.

8.4 THE UP-DATING OPERATION DURING THE PHASE SQ5

The up-dating phase SQ5 is directly started when receiving an order K3 for tone connection or K4 for tone release (see Table 4, upper part).

The data provided by the computer are:

a. The section code CS*c* and the junctor code CJ*c*;

b. The tone code CT*n*.

These codes define, in the selected section of T*d*, a cross-point X*d* of coordinates V*d*, H*d* which must be closed (order K3) or opened (order K4).

As described in Paragraph 2 (FIG. 6), the homologous sections in T*c* and T*d* are simultaneously selected and Table 6 shows that the contents of the selection in T*c* is rewritten without modification (logical condition B*c* = SQ5.S*c*) while the state of some switching circuits in T*d* is modified as it follows:

a. Condition B*d* = SQ5.*k*1.V*d*.H*d*: closing of the circuit X*d* for an order K3;

b. Condition B*d* = SQ5.$\overline{Vd}$.S*d*: rewriting without modification of the state of all the circuits in the section except for the state of those associated to the vertical V*d*.

Consequently:

When up-dating under the control of an order K3, the circuit X*d* receives a closing order B*d* and all the other circuits associated to the vertical V*d*, that is to say to the junctor in which the tone is injected, receive an opening order $\overline{Bd}$ so as to be sure that this junctor receives only one tone;

When up-dating under the control of an order K4, all the circuits associated to V*d* receive an opening order $\overline{Bd}$ so as to be sure that this junctor does not receive any tone.

While there has been shown what is at present thought to be the preferred embodiment of the invention, it is understood that modifications may be made therein and it is intended to cover in the appended claims, all such modifications which fall within the true spirit and scope of the invention.

We claim:

1. A marker circuit for a switching network comprising a plurality of selection stages, wherein each stage comprises a plurality of sections, each section including a plurality of electronic switches arrayed as individual crosspoints in a switching matrix, memory elements associated with each switch, with the elements being combined into a shift register, an address identification code counter synchronously readable with said register, the central bits of the code displayed by the counter serving to identify one coordinate of the matrix being read, and the extreme bits of said code identifying the other coordinate of a switch in said matrix, the invention comprising:

a. an input circuit comprising an order register and an initial data register containing the identification data needed for the operations of path connection and path release through said network, b. an operation sequencing circuit for providing phase signals, a first phase signal indicative of the idle phase of the marker and the other phase signals controlling, respectively, the performance of operations of assembling data from said switch registers, analyzing the data and updating the data, c. access circuits to the switching network comprising a section selection circuit enabling the selection in each stage of the section identified by an initial data code, d. a write control circuit to which the information read in the switch registers of the selected sections is applied and which provides the information to be written back into the said registers for updating the switch registers, and their crosspoints, e. an assembly and analysis circuit which collects the data needed for performing an assembly order and analyzes the data to obtain any missing data necessary for the execution of the order, and f. an inlet/outlet marking circuit, said last-mentioned circuit providing marking signals during the reading of the register of a selected section when the parts of the code which characterize one coordinate of a switch are identical to the corresponding initial data codes to control the up-dating of the information written in the switch registers.

2. A marker circuit as claimed in claim 1, wherein said memory elements comprise individual flip-flop circuits, with a flip-flop circuit at each coordinate of a stage.

3. A marker circuit according to claim 1, wherein there is a tone distribution stage similar to the switching stages, designed to execute a tone connection and a tone release operation where the reception of such an order controls the switching in one phase, that the signal of said one phase controls first the selection, of a switching tone stage of the sections identified by the code read and the reading of the contents of the registers of the said sections, and wherein processing of data is performed under the control of the marking signals provided by the input circuit and includes rewriting without any modification in the selected section of the final switching stage and in allowing the rewriting of the final switching section.

4. A marker circuit according to claim 2, wherein the fact that the operation orders are sent by a computer and that, when said computer receives a signal of operation end I, it transmits a marker release order which controls the switching to the inactive.

5. A marker according to claim 1, wherein the connection and the release of a path is effected under the control of a computer and wherein the reception of such a connection order controls the changeover from the idle phase into the assembly phase, that the assembly phase signal controls; first, the selection of the sections in the switching stages identified by the codes and the reading of the contents of the registers of said sections; second, the processing of said data which comprises writing them back into the registers without any modification through the circuit and in transmitting them to a modifying circuit, said modifying circuit receives said data, and the central bits of the code identifying, by a first selection signal obtained by decoding the one coordinate to which the circuit Xt belongs; and third, second selection signals Na and Nc from two registers, each of these registers comprising one flip-flop per said one coordinate, that the combination of the first and second selection signals controls the setting to the 1 state of the corresponding flip-flop in either register.

* * * * *